United States Patent Office 3,250,664
Patented May 10, 1966

3,250,664
PROCESS OF PREPARING WET STRENGTH PAPER CONTAINING pH INDEPENDENT NYLON-TYPE RESINS
John S. Conte, Ridley Park, and Robert W. Faessinger, Media, Pa., assignors to Scott Paper Company, Philadelphia, Pa., a corporation of Pennsylvania
No Drawing. Filed Oct. 24, 1963, Ser. No. 318,512
9 Claims. (Cl. 162—164)

This invention relates to a method of treating cellulosic fibers and their products; more particularly, this method pertains to improving, by means of a novel pH independent nylon-type resin, the wet-strength properties of cellulosic materials, such as paper, paperboard, molded paper, or pulp articles, etc. The present invention is also directed to the improved novel cellulosic fibers and products obtained therefrom, including the pulp-starting material treated with the novel water-soluble nylon-type of resin.

In wet-strength resin applications, urea-formaldehyde and melamine-formaldehyde resins have heretofore played a dominant role; however, these resins have an inherent shortcoming which is their pH dependency. Other wet-strength resins have been developed which have no formaldehyde as their base, and among these, pH-independent resins have become increasingly important. Prior art wet-strength resins, however, represent few alternative chemically and physically different resin systems. The present resin system is different in nature from previous resins. It also has superior properties over previously-known pH independent resins. As such, this system is a welcome addition to the few acceptable prior art resins.

Thus, this invention is generally directed to the wet-strengthening of pulp materials to improve the end product by means of a novel pH independent nylon-type resin which may be generally described as a balanced polymeric reaction product of (a) lactams and/or amino-carboxylic acids, (b) dibasic acids, esters or anhydrides or mixtures thereof, (c) polyalkylene polyamines, and (d) crosslinking agents. Paper prepared under acid, neutral or alkaline conditions yield superior products according to this method.

Prior art water-soluble, crosslinked polyamine, dibasic acid resins suitable for wet-strength purposes have been mostly modified by the addition of chain-extending components such as glycols. While this addition has given an alternative resin, a glycol having a plurality of the same reactive groups has not contributed to the resin the needed balance of properties.

Other types of chain-extending amines having terminal moieties have been used, but again, the amines having a plurality of the same reactive groups at the terminal positions have failed to yield a resin with sufficiently balanced properties.

It has now been found that the introduction of carboxyl and amine groups through nylon-type precursors gives novel resins eminently suitable for applications such as making wet-strength paper.

It is not known why a particular chain-extending component gives better results; however, in the present case, the lactam or the amino-carboxylic acid seems to impart better properties to the paper due to the proper balance of the amide group distribution. Upon proper crosslinking of the resin components, these properties are more pronounced, especially if characterized by the results obtained when the resin is cured to a water-insoluble state such as in this novel paper wet-strength application.

Thus, this invention is accomplished by the method of adding wet-strength resin to any type of pulp slurry, either at the beater end, or to paper at the dry end, or to paper by means of a size press wherein the resin is being combined with a cellulosic material in an amount of from about 0.1% to about 10.0%, said resin being a water-soluble nylon-type resinous composition which is prepared by reacting:

(a) a compound selected from at least one member of the group consisting of amino-carboxylic acids of the formula

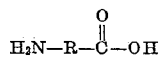

and lactams of the formula

wherein R is a divalent radical selected from the group consisting of saturated 1 to 20 carbon atom radicals, unsaturated 2 to 20 carbon atom radicals, alicyclic radicals and aromatic radicals; and R' is an aliphatic chain radical of from 3 to 18 carbon atoms;

(b) a compound selected from at least one member of the group consisting of dibasic acid of the formula

HOOC—R"—COOH wherein R" is a divalent radical selected from the group consisting of saturated 1 to 20 carbon atom radicals, unsaturated 2 to 20 carbon atom radicals, alicyclic radicals, aromatic radicals, and the esters and anhydrides of these acids;

(c) at least one polyalkylene polyamine compound of the formula $H_2N$—$(R'''NH)_n$—H wherein R''' is an alkylene group of from 2 to 8 atoms and n is an integer of from about 1 to 5 provided, however, that at least a significant portion (about 50% to about 60%) of the polyamines should be where n is greater than one;

the above (a), (b) and (c) components on mole basis in the reaction mixture being of from about 0.1:1.0:0.9 to about 1.0:1.0:1.3 respectively; the reaction being carried out at a temperature of from about 140° C. to about 230° C. for a time sufficient to achieve a viscosity of about A to X on Gardner-Holdt scale at about 40.0% solid concentration in the aqueous reaction solution and 25° C.; further reacting the obtained condensation product with about 0.8 to about 1.5 moles of a crosslinking agent per mole of reactive amine groups, said crosslinking member being selected from at least one member of the group consisting of 1,3 dichloropropanol, epichlorohydrin, dichloroethylene, dichlorobutene, divinylsulfone, methylene bisacrylamide, diallylamine, glyoxal crotonaldehyde, divinylether, diglycidylether, glycidylaldehyde at a temperature of from about 25° C. to about 90° C. until the resulting product has a viscosity of about A to T on Gardner-Holdt scale at about 10% solids and at 25° C., and stopping the reaction by adjusting the pH to about 4 to 5.

In the preparation of these products, as illustrated above, an amino-carboxylic acid or lactam, the dibasic acid, ester or anhydride, and polyalkylene polyamine are reacted in mole ratios, respectively, from about 0.1:1.0:0.9 to about 2.0:1.0:1.3 or, in the preferred mode, in a ratio of from about 0.1:1.0:0.9 to about 1.0:1.0:1.3, in an aqueous solution to produce a high molecular weight condensation product having a viscosity which ranges from about A to X on the Gardner-Holdt scale at about 40.0% solids and at 25° C.

This high molecular weight polyaminopolyamide is reacted with about 0.5 to about 2.0 moles of a crosslinking agent per mole of reactive amine groups in the condensate until a 10% solution has a viscosity of A to T on the Gardner scale at 25° C. However, the preferred range for the crosslinking agent is from about 0.8 mole to about 1.5 moles per mole of reactive amine groups in the condensate.

The reaction is stopped by dilution and/or adjusting the pH to 4–5 with a suitable mineral acid such as hydrochloric acid, etc. In this method the preferred mode of stopping the reaction is by adjusting the pH when the condensate contains about 10% solids. A more complete description of the reaction is given below with particular reference to the examples.

Suitable amino-carboxylic acids, esters or lactams which may be employed are, in general, amino acids having from 2 to 18 carbon atoms or other aliphatic aminocarboxylic acid. The preferred amino acids are those having from 5 to 14 atoms separating the —$NH_2$ and —COOH groups. The corresponding preferred lactams are those having 3 to 14 carbon atoms between the two condensed groups.

Other amine group- and carboxylic group-containing compounds are those having an aromatic ring in the molecule Aromatic groups such as phenyl, napthyl, etc., are suitable. The amino group may be directly substituted on the aromatic nucleus or it may be a terminal carbon atom of an alkyl group of 1 to 7 carbons substituted on the aromatic ring. Likewise, the carboxylic acid group may be directly substituted on the aromatic ring or on a terminal carbon atom of an alkyl group of 1 to 7 carbons substituted on the aromatic ring. Water solubility of the final resin characterizes the useful amine and carboxyl group-containing compounds.

Suitable amino carboxylic acids representative of the above groups are 6-amino caproic acid, 10-aminodecanoic acid, 9-aminostearic acid, 12-aminostearic acid, 13-aminobehenic acid, 9-aminopalmitic acid, glycine, 13-aminostearic acid, p-(2-aminoethyl) benzoic acid, p-aminophenylacetic acid, p-aminobenzoic acid and the like. Lactams which are suitable are pyrrolidone, ε-caprolactam, (Laurolactam) and the like. Generically, the lactams may be represented by

wherein R' is of from 3 to 18 carbon atoms in the interposed chain. Suitable amino acids can be generically represented by the formula $H_2N$—R—COOH wherein R is a divalent radical selected from the group consisting of 1 to 20 carbon atom radicals (2 to 20 carbon atom radicals for the unsaturated acids), alicyclic radicals and aromatic radicals. Amino acids containing side chains are also included. Blends of these amino acids or lactams may also be employed. Preferred amino acids and lactams besides those mentioned above are those wherein R and R' are saturated carbon chains of from 5 to 14 and 3 to 14 carbon atoms, respectively. Caprolactam represents the preferred species.

The dicarboxylic acids which are suitable for the practice of this invention are those saturated aliphatic dicarboxylic acids containing 3 to 14 carbon atoms as well as alicyclic, aromatic and ethenoid dicarboxylic acids, their esters and anhydrides. Carboxylic acids falling in this group may be represented by the Formula HOOC—R''—COOH, where R'' is a divalent radical selected from the group consisting of saturated 1 to 20 carbon atom radicals, unsaturated 2 to 20 carbon atom radicals, alicyclic radicals, aromatic radicals and esters and anhydrides of these acids. Dicarboxylic acids of this type, their esters and anhydrides are, for example, adipic acid, dimethyl adipate, succinic acid, succinic anhydride, glutaric anhydride, axelaic acid, sebasic acid, suberic acid, isosebasic acid and other aliphatic acids such as diglycolic acid, and γ, γ¹ oxidibutyric acid; the aromatic dicarboxylic acids, e.g., phthalic acid, phthalic anhydride, isophthalic acid, terephthalic acid, dibenzoic acid; alicyclic compounds such as cyclopentane - 1,3 - dicarboxylic acid, cyclohexane - 1,3 - dicarboxylic acid, cyclohexane - 1,4 - dicarboxylic acid and the like. Other dicarboxylic acids, esters, or anhydrides which may be used are the $C_2$ to $C_{10}$ ethenoic acids such as fumaric acid, maleic acid, maleic anhydride, itaconic, citraconic, and mesaconic acids, etc. Blends of two or more of these dicarboxylic acids, esters or anhydrides may also be used as long as the resulting high molecular weight polyaminopolyamide is water soluble. Preferred acids are the saturated and unsaturated straight 4 to 20 carbon chain acids. Of these, the preferred are the saturated 3 to 20 carbon chain acids. Adipic acid represents the preferred species.

The polyalkylene polyamines suitable for this invention are polyamines represented by the general Formula $NH_2(R'''NH)_nH$ where R''' is an alkylene group of 2 to 8 carbon atoms, but preferably up to four with two and three carbon atoms representing the most preferred group, and where n is an integer from 1 to 5, preferably 2 to 5, provided, however, that at least a significant portion (about 50% to about 60%) of the species should be where n is greater than one. Polyalkylene polyamines are such as diethylene triamine, triethylene tetramine, tetraethylene pentamine, bishexamethylene diamine, dipropylene triamine and the like. Blends of two or more of these polyalkylene polyamines may also be used, of which the polyethylene polyamines are preferred.

As crosslinking agents, epichlorohydrin or 1,3 - dichloropropanol are the preferred compounds. In addition, other crosslinking agents which may be used are those known to react with amines such as halohydrins, dichloroethylene, dichlorobutene, divinylsulfone, methylene bisacrylamide, diallylamine, glyoxal, crotonaldehyde, divinylether, glycidylaldehyde, diglycidylether and the like.

The preparation of the novel resinous composition of this invention is carried out in two steps. The first stage reaction, which is between the aminocarboxylic acid or lactam, dicarboxylic acid, and polyalkylene polyamine, is carried out at a temperature ranging from 140° C. to 230° C. at reduced or atmospheric pressure. This reaction is continued within this temperature range until the viscosity of the condensation product falls within the aforementioned A–X Gardner range at 25° C. Generally, the above reaction is carried out at conditions causing the ring opening of the lactam used.

The second step reaction between the polyaminopolyamide formed above and the crosslinking agent, preferably epichlorohydrin or 1,3 - dichloropropanol, is carried out in a temperature range of from about 25° C. to about 90° C. until the resulting resinous solution has a viscosity of about A to T on the Gardner-Holdt scale at 10% solids at 25° C. At this point, the reaction is stopped by dilution and/or adjusting the pH to 4–5.

A number of representative examples are included to illustrate the invention. Although these examples describe in detail some of the more particular aspects of the invention, the examples are intended primarily for purposes of illustrating the invention and not to limit its scope.

EXAMPLE 1

Ninety-three grams (0.9 mole) of diethylene triamine, 20.0 grams (0.136 mole) of triethylene tetramine and 50 grams of water were placed in a vessel equipped with a mechanical agitator and condenser. To this solution were added 20.0 grams (0.177 mole) of ε-caprolactam and 145 grams (1.0 mole) of adipic acid. After the ε- caprolactam and the adipic acid had dissolved in the amine solution, the resulting mixture was heated until the theoretical amount of water was removed. Then, the mixture was heated in the range of 195–210° C. for 3½ hours, after which a vacuum from a water pump was applied to the flask for about 0.5 hour at 180–190° C. to ensure complete reactivity. The product so made was cooled to about 140° C. and dissolved in 385 grams of water. The viscosity, as measured at 25° C., of a solution with about 39.6% solid content was F on the Gardner scale.

To 91 grams of the above solution were added 263 grams of water. This solution then was heated to 50° C. at which time 16.0 grams of epichlorohydrin were added dropwise. The resulting mixture now was heated at 65° C. until a Gardner viscosity of J had been attained; then, 150 grams of water were added all at once and the product cooled to room temperature. This product, containing 9.4% solids, was adjusted to a pH of 4.0 and had a Gardner viscosity between G and H.

EXAMPLE 2

A polyaminopolyamide was prepared from 93.0 grams (0.9 mole) of diethylene triamine, 20.0 grams (0.136 mole) of triethylene tetramine, 53.0 grams (0.48 mole) of ε-caprolactam and 145.0 grams (1.0 mole) of adipic acid according to the procedure described in Example 1. The resultant polyaminopolyamide solution contained 39.7% solids and had a Gardner viscosity of I.

To 100 grams of the above polymer were added 260.0 grams of water and the solution was heated to 50° C.; then, 23.0 grams of epichlorohydrin were added dropwise. This mixture was heated at 65–70° C. until a Gardner viscosity of about F had been attained. Then, 150 grams of water were added and the diluted solution cooled to room temperature. This product, containing 9.82% solids, was adjusted to a pH of 4.0 and had a Gardner viscosity between C and D.

EXAMPLE 3

A polyaminopolyamide was prepared from 170 grams (1.060 moles) of an amine mixture which was 67% tetraethylene pentamine and 33% diethylene triamine, 113 grams (1.0 mole) of ε-caprolactam and 145.0 grams (1.0 mole) of adipic acid according to the procedure described in Example 1 with the exception that the condensation was conducted at 195–210° C. for 6½ hours. The solution contained 43.9% solids and had a viscosity of M.

To 73.0 grams of this polyaminopolyamide were added 57.0 grams of water. This solution was heated to 50° C. and 20.0 grams of epichlorohydrin were added dropwise. Heating was continued at 70–75° C. After fifteen minutes, 50.0 grams of water were added and heating was continued at 65–70° C. until a viscosity of J was reached. Again 50 grams of water were added and the solution was heated at 65–70° C. until a viscosity of J was reached and 100 grams of water were added. Heating was continued until a viscosity of J was attained and 200 grams of water were added and the product was adjusted to a pH of 4.0. This product contained 8.6% solids and had a Gardner viscosity of F.

EXAMPLE 4

A polyaminopolyamide was prepared, according to Example 1, from 113 grams (1.1 moles) of diethylene triamine, 29.5 grams (0.25 mole) of ε-caprolactam and 145.0 grams (1.0 mole) of adipic acid having a viscosity measured at 25° C. of D on the Gardner scale, and a nonvolatile solids content of about 39.3%.

To 87.5 grams of the above solution were added 200 grams of water. This solution was heated to 50° C. and 14 grams of epichlorohydrin were added dropwise. The resulting mixture was heated at 70–75° C. until a Gardner viscosity of I had been reached. Then, 160 grams of water were added and the product was cooled to room temperature. This product, containing about 10.2 solids, was adjusted to a pH of 4.0 and had a viscosity of about E.

EXAMPLE 5

One hundred seventy-two grams (1.18 moles) of triethylene tetramine and 25 ml. of water were placed in a round bottom flask equipped with a mechanical agitator and condenser. To this solution were added 26.5 grams (0.235 mole) of ε-caprolactam and 118.1 grams (1.0 mole) of succinic acid. This mixture was heated to 195–200° C. for four hours; then vacuum from a water pump was applied to the flask for ½ hour at 189–190° C. to ensure complete reactivity. The product was cooled to about 140° C. and dissolved in 431 grams of water. The viscosity, as measured at 25° C. in a solution containing about 40.4% solids was C on the Gardner scale.

To 87.5 grams of this polyaminopolyamide were added 12.5 grams of water. The solution was heated at 50° C. and 24.0 grams of epichlorohydrin were added dropwise. The mixture was heated at 60–70° C. After fifteen minutes, 50 grams of water were added and the heating continued until a viscosity of L on the Gardner scale had been attained. Again 50 grams of water were added. Heating continued until a viscosity of L was reached and 50 grams of water were again added. Again the heating continued at 60–70° C. until a viscosity of L was reached and 50 grams of water were added. The resin solution was heated an additional 0.5 hour and then diluted with 100 grams of water. The product was adjusted to a pH of 4.0 and 13.6% solution had a Gardner viscosity H to I.

EXAMPLE 6

125 grams (1.07 mole) of an amine mixture which is 33% triethylene tetramine and 67% diethylene triamine were added to 29.5 grams (0.25 mole) of ε-caprolactam, 109 grams (0.75 mole) of adipic acid and 29.5 grams (0.25 mole) of succinic acid. The mixture was heated at 190–200° C. for 4 hours; then vacuum from a water pump was applied to the flask for about ¼ hour at 180–190° C. The product was cooled to about 140° C. and 385 grams of water were added. The polyaminopolyamide solution contained 40.6% solids and had a Gardner viscosity of about E.

To 68.5 grams of this polyaminopolyamide were added 200 grams of water. The solution was heated to 50–60° C. and 16 grams of epichlorohydrin were added dropwise. The mixture was heated at about 80–85° C. until a Gardner viscosity of about F had been attained; then 160 grams of water were added and the resin solution adjusted to a pH of 4.0. This product, containing 9.3% solids, had a viscosity of C.

EXAMPLE 7

A polyaminopolyamide was prepared according to Example 1 from 112 grams (1.09 moles) of diethylene triamine, 27.4 grams (0.25 mole) of p-aminobenzoic acid and 145.0 grams (1.0 mole) of adipic acid with the exception that the condensation was conducted at 190–205° C. for 4½ hours. The polyaminopolyamide solution contained 39.5% solids and had a viscosity of about C on the Gardner scale.

To 92.0 grams of this polyaminopolyamide were added 160.0 grams of water. The solution was heated to 70° C. and 14.0 grams of epichlorohydrin were added dropwise. The heating was continued at 70–75° C. until a Gardner viscosity of A was attained. Then, 100 ml. of water were added and heating was continued at 60° C. until a viscosity of G was reached. Finally, 150 ml. of water were added and the product was adjusted to a pH of 4.0 and contained 9.7% solids. It had a Gardner viscosity of E.

EXAMPLE 8

A polyaminopolyamide was prepared according to Example 1 from 120 grams (1.03 moles) of an amine mixture which is 33% triethylene tetramine and 67% diethylene triamine, 22.0 grams (0.194 mole) ε-caprolactam and 145 grams (1.0 mole) adipic acid with the exception that the condensation was conducted at 195–205° C. for 5¼ hours. The solution contained 40.2% solids and had a viscosity of H.

To 91.0 grams of the above solution were added 260.0 grams of water. This solution was heated to 50° C. and 17.5 grams of epichlorohydrin were added dropwise. The resulting mixture was heated to 65–70° C. until a viscosity of $Z^2$ on the Gardner scale had been reached. Then 350 grams of water were added. The product, containing 7.3% solids, was adjusted to a pH of 4.0.

EXAMPLE 9

To 91.0 grams of a polyaminopolyamide prepared according to Example 1 were added 67.0 grams of water and 20.0 grams of 1,3-dichloropropanol. The mixture was heated at 50–60° C. until a viscosity of $Z^6$ was reached; then 236 grams of water were added. The product, containing 13.8% solids, was adjusted to a pH of 4.0.

The resinous compositions prepared as herein described are water soluble and may be used to improve the properties of paper, textile, etc.

As mentioned above, the novel resins impart improved wet-strength to paper whether made under acid, alkaline or neutral conditions.

This resin is a beater-additive type of wet-strength producing resin; however, it may also be used to impregnate the paper sheet by immersion, spraying, etc., following which, the paper may be further processed to cure the resin. Normally, the resin is self-curing and no extra heating step is needed.

This resin is preferably incorporated into pulp by adding it to the aqueous suspension of paper stock or furnish in the beater stock chest, Jorden engine, fan pump, headbox or at any other suitable point ahead of the wire or sheet-forming stage. As mentioned before, the wet strength is imparted to the sheet by heating or allowing the sheet to self-cure after the normal finishing steps are employed.

An advantageous amount of resin added to the paper sheet constitutes about 0.1% to 10.0% resin solids based on the dry weight of the paper. A range of from about 0.1% to about 5% is preferred. However, the amount may be varied to suit the particular need. For example, in some pulp-molding applications, such as for paperboard manufacture, the 10% limit may be exceeded.

Paper and pulp slurries having a pH of from 4 to about 8 may be effectively treated with the novel resin. Equally good results are obtained over the above pH range.

Representative data obtained by using the novel resins in accordance with the above examples are illustrated in the following table.

Table

| Example | Percent of Resin Added Based on Weight of Dry Pulp | Weight of Sheet (lb./ream; 2,885 ft.²/ream) | Cured Wet Tensile, oz./in. |
| --- | --- | --- | --- |
| 1 | 1.0 | 20.0 | 56.9 |
| 2 | 1.0 | 20.0 | 56.6 |
| 3 | 1.0 | 20.3 | 57.4 |
| 4 | 1.0 | 19.7 | 56.5 |
| 6 | 1.0 | 20.3 | 54.3 |
| 8 | 1.0 | 20.1 | 56.3 |
| Control | .0 | 20.0 | 3.4 |

Sheets tested according to the examples above were prepared on a Noble and Wood Handsheet machine from bleached West-Coast sulphite pulp having a Canadian freeness of 475 cc. and at a pH of about 6.5. One-inch tensile strips were oven-cured at 110° C. for 30 minutes and conditioned before measurements were made on a Thwing-Albert Tensile tester according to the standard TAPPI T456m–49 method.

What we claim is:

1. The process for producing an improved wet-strength paper which comprises
    adding to an aqueous suspension of cellulosic fibers used in making a sheeted material, of from about 0.1% to about 5%, based on the weight of the dry pulp of a water-soluble nylon-type resinous product prepared by reacting:
    (a) a compound selected from at least one member of the group consisting of amino-carboxylic acids of the formula

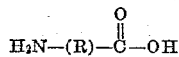

and lactams of the formula

wherein R is an aliphatic chain of from 1 to carbon atoms and R' is an aliphatic chain of from 3 to 18 carbon atoms in the interposed chain;
    (b) a compound selected from at least one member of the group consisting of a dibasic acid of the formula

HOOC—R″—COOH wherein R″ is a divalent radical selected from the group consisting of saturated and unsaturated radicals up to 20 carbon atoms, alicyclic radicals, and aromatic radicals, and the esters and anhydrides of these acids;
    (c) at least one polyalkylene polyamine compound of the formula

H₂N(R‴NH)ₙ—H wherein R‴ is an alkylene group of from 2 to 8 carbon atoms and n is an integer of from about 2 to 5;
    the above (a), (b) and (c) components on mole basis in the reaction mixture being of from about 0.1:1.0:0.9 to about 2.0:1.0:1.3 respectively; thereafter further reacting the obtained condensation product with about 0.5 to about 2.0 moles of a cross-linking agent per mole of reactive amine groups, forming the intimately mixed cellulosic fiber suspension into a sheeted product, and curing the thus contained resin to a water insoluble state.

2. A process for producing an improved wet-strength paper which comprises
    adding to an aqueous suspension of pulp of from about 0.1% to about 10%, based on the weight of dry pulp, a water-soluble nylon-type resinous product prepared by reacting:
    (a) a compound selected from at least one member of the group consisting of amino-carboxylic acids of the formula

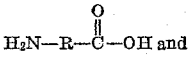

lactams of the formula

wherein R is a divalent radical selected from the group consisting of saturated 1 to 20 carbon atom radicals, unsaturated 2 to 20 carbon atom radicals, alicyclic radicals and aromatic radicals; and R' is an aliphatic chain of from 3 to 18 carbon atoms;

(b) a compound selected from at least one member of the group consisting of dibasic acid of the formula

HOOC—R''—COOH wherein R'' is a divalent radical selected from the group consisting of saturated 1 to 2 carbon atom radicals and unsaturated 2 to 20 carbon atom radicals, alicyclic radicals, and aromatic radicals, and the esters and anhydrides of these acids;

(c) at least one polyalkylene polyamine compound of the formula $H_2N$—$(R'''NH)_n$—H wherein R''' is an alkylene group of from 2 to 8 atoms and $n$ is an integer of from about 1 to 5 of the polyamine compound provided that at least 50% is where $n$ is greater than one;

the above (a), (b) and (c) components on mole basis in the reaction mixture being of from about 0.1:1.0:0.9 to about 1.0:1.0:1.3 respectively; the reaction being carried out at a temperature of from about 140° C. to about 230° C. for a time sufficient to achieve a viscosity of about A to X on Gardner-Holdt scale at about 40.0% solid concentration in the aqueous reaction solution and 25° C.; further reacting the obtained condensation product with about 0.8 to about 1.5 moles of a crosslinking agent per mole of reactive amine groups, said crosslinking member being selected from at least one member of the group consisting of 1,3-dichloropropanol, epichlorohydrin, dichloroethylene, dichlorobutene, divinylsulfone, methylene bisacrylamide, diallylamine, glyoxal, crotonaldehyde, divinylether, glycidylaldehyde and diglycidylether at a temperature of from about 25° C. to about 90° C. until the resulting product has a viscosity of about A to T on the Gardner-Holdt scale at about 10% solids and at 25° C., and stopping the reaction by adjusting the pH to about 4 to 5, forming the pulp slurry into a sheet, and curing the thus contained resin to a water-insoluble state.

3. A process for producing an improved wet-strength paper which comprises (1) adding to an aqueous dispersion of pulp of from about 0.1% to about 5%, based on the weight of the dry pulp, a water-soluble nylon-type resinous product prepared by reacting:

(a) a compound of the formula

wherein R' is an alkyl radical containing from 3 to 18 carbon atoms;

(b) a compound of the formula

HOOC—R''—COOH wherein R'' is a divalent radical containing from 2 to 20 carbon atoms;

(c) at least one polyalkylene polyamine compound of the formula $H_2N$—$(R'''NH)_n$—H wherein R''' is an alkylene group of from 2 to 8 carbon atoms and $n$ is an integer of from 2 to 5;

the above (a), (b), and (c) components on mole basis in the reaction mixture being of from about 0.1:1.0:0.9 to about 1.0:1.0:1.3 respectively, the reaction being carried out at a temperature of from about 140° C. to about 230° C. for a time sufficient to achieve a viscosity of from about A to X on Gardner-Holdt scale at 40% solids at 25° C.; further reacting the obtained condensation product with about 0.5 to about 2.0 moles of epihalohydrin per mole of reactive amine groups at a temperature of from about 25° C. to about 90° C. until the resulting product has a viscosity of about A to T on the Gardner-Holdt scale at about 10% solids and at 25° C., and then stopping the reaction;

(2) forming the intimately-mixed pulp into a paper sheet, and (3) curing the incorporated product to a water-insoluble state.

4. The process for producing an improved wet-strength sheet material according to claim 1 wherein (a) is ε-caprolactam, (b) is adipic acid and (c) is a mixture of diethylene triamine and triethylene tetramine and (d) is epichlorohydrin.

5. The process for producing an improved wet-strength sheet material according to claim 1 wherein (a) is ε-caprolactam; (b) is a mixture of adipic acid and succinic acid; (c) is a mixture of triethylene tetramine and diethylene triamine and (d) is 1,3-dichloropropanol.

6. The process for preparing an improved wet-strength sheet material according to claim 2 wherein (a) is p-aminobenzoic acid, (b) is adipic acid, (c) is diethylene triamine, and the crosslinking agent is epichlorohydrin.

7. A paper sheet material product of improved wet-strength produced by the process of claim 1.

8. A paper sheet material product of improved wet-strength produced by the process of claim 2.

9. A paper sheet material of improved wet-strength produced according to claim 1 wherein (a) is ε-caprolactam, (b) is adipic acid, (c) is polyethylene polyamine and the crosslinking agent is epichlorohydrin.

References Cited by the Examiner

UNITED STATES PATENTS

| | | | |
|---|---|---|---|
| 2,926,116 | 2/1960 | Keim | 162—164 |
| 3,086,961 | 4/1963 | House et al. | 162—164 |
| 3,125,552 | 3/1964 | Loshaek et al. | 162—168 |

DONALL H. SYLVESTER, *Primary Examiner.*

S. I. BASHORE, *Assistant Examiner.*